Figure 1:
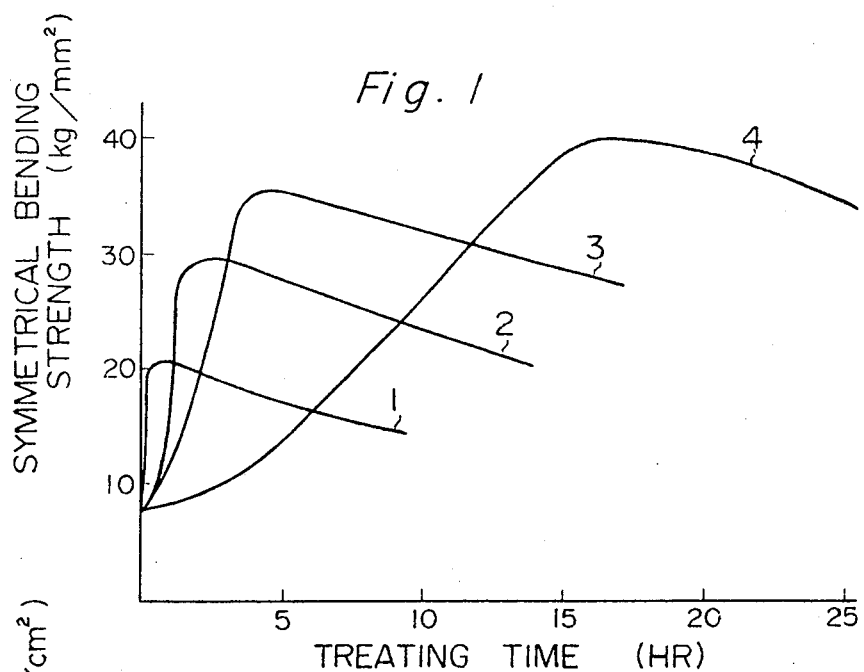

United States Patent [19]

Inoue et al.

[11] 3,798,013

[45] Mar. 19, 1974

[54] DOUBLE ION EXCHANGE METHOD FOR STRENGTHENING GLASS ARTICLES

[75] Inventors: Touru Inoue, Nishnomiya; Nobuyoshi Ohsato, Itami; Jun Hasegawa, Takarazuka, all of Japan

[73] Assignee: Nippon Sheet Glass Co., Ltd., Osaka, Japan

[22] Filed: Apr. 24, 1972

[21] Appl. No.: 246,815

[30] Foreign Application Priority Data
Apr. 26, 1971  Japan.............................. 46-27811

[52] U.S. Cl. .................................................. 65/30
[51] Int. Cl. .............................................. C03c 21/00
[58] Field of Search ........................................ 65/30

[56] References Cited
UNITED STATES PATENTS
3,395,998  8/1968  Olcott ..................................... 65/30
3,410,673  11/1968  Marusak ................................. 65/30
3,433,611  3/1969  Saunders et al. ....................... 65/30

*Primary Examiner*—Robert L. Lindsay, Jr.
*Attorney, Agent, or Firm*—Wenderoth, Lind & Ponack

[57] ABSTRACT

A process for increasing the strength of a glass article by subjecting a glass article containing alkali metal ion A to a treatment of exchanging the ion A with an alkali metal ion B having a larger ion radius than the ion A, wherein the exchanging treatment is performed in two successive stages, and the second-stage exchanging treatment is carried out under milder treating conditions using a treating salt having a larger ion B content than in the first-stage treatment.

4 Claims, 3 Drawing Figures

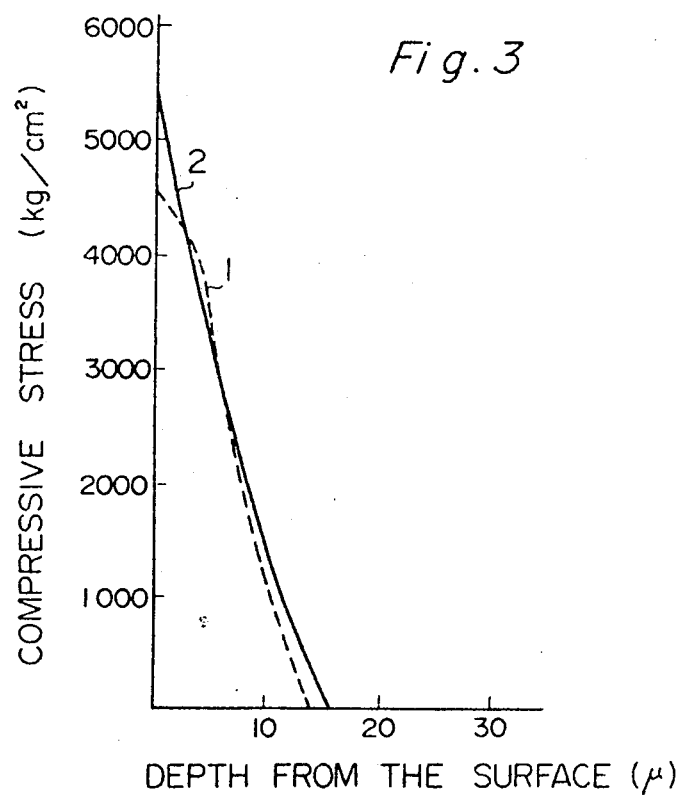

DOUBLE ION EXCHANGE METHOD FOR STRENGTHENING GLASS ARTICLES

This invention relates to a method of treating glass articles to increase their mechanical strength, and more specifically, to a method of treating glass articles by causing compressive stress on the surface of the glass article through ion-exchange, thereby to increase their mechanical strength.

One well-known method of treating a glass article to increase its mechanical strength involves contacting alkali metal ion A contained in the glass article with a salt containing alkali metal ion B having a larger ion radius than that of the metal ion A at a temperature below the strain point of the glass article, and causing compressive stress on the surface layer of said glass article by the exchange of the metal ions. When a glass article is treated by this method, the alkali metal ion B in the salt is introduced into the surface layer of the glass article in exchange for the alkali metal ion A in the glass article, and the larger ion B tries to occupy smaller space previously occupied by the smaller ion A, with the consequence that the surface layer tends to have a larger volume. But since the temperature at this time is not such as to relax this tendency by the viscous flow of glass at a sufficient speed, the volume expansion remains on the surface layer of the glass article as compressive stress. In order to perform the ion-exchange in the surface layer with good efficiency, it is preferred that the contact with the salt should be performed at higher temperatures and for longer periods of time. However, since this simultaneously causes an increase in the speed of relaxing mentioned above, the residual compressive stress caused by the ion-exchange decreases by the relaxing.

Accordingly, there is an optimum period of time which gives the maximum residual compressive stress in the surface layer of a glass article by contacting the glass article with the salt at a certain temperature. The residual maximum compressive stress becomes larger at lower contacting temperatures, but the optimum time becomes extremely longer. For example, the above situation is well explained by the accompanying FIG. 1 which shows the relation between the strength of a sheet glass (commercially available soda-lime-silicate glass) contacted with a potassium salt at varying temperatures and the time required for this treatment. Curves 1 to 4 in FIG. 1 were obtained by plotting the strength (symmetrical bending strength) of the glass contacted with the potassium salt at 550°C., 520°C., 490°C., and 460°C. respectively against the periods of time required to perform this treatment. The measurement of the strength was made by the symmetrical bending strength testing method using as a specimen a glass sheet 3 mm thick, 60 mm wide and 60 mm long which after the salt treatment, had been injured by letting fall the powders of silicon carbide having a particle size corresponding to Tyler's Nos. 60–65 sieves (208 to 246 microns) at an angle of 45° from a height of 165 mm. The details of the symmetrical bending strength testing method is described in Stekro i Keramika, 9, 9 (1962).

Glass having large compressive stress on its surface or a layer very near the surface exhibits very high strength unless its surface is injured, and this is so even when the depth of the layer having the compressive stress is not large. Therefore, such glass finds utility especially in applications in which injuries to the glass from outside are unlikely to occur, for example, as an insidelayer of a laminated safety glass or an innerlayer of a multiple glazing unit. However, the provision of an extremely large compressive stress on the surface of the glass or in a layer very near the surface by a short time treatment has been difficult except with glasses of selected compositions, that is, those having a large ion-exchange speed and a small stress relaxing speed, as shown, for example, in British Pat. No. 966,733 or U.S. Pat. No. 3,485,702.

Accordingly, an object of this invention is to provide an improved method of obtaining glass having a very large compressive stress on its surface or a layer very near the surface with ease and within relatively short periods of time.

Another object of this invention is to provide a novel and improved method of producing tempered glass having very large compressive stress on its surface or a layer very near the surface, which is applicable not only to glass of selected composition as in the prior art, but also to glasses of a far wider range of compositions.

From previous work on the relaxation of compressive stress which is observed at the time of ion-exchange in the surface layer of glass at high temperatures, it has been found that the rate of stress reduction within a certain period of time (this rate will be referred to as a relaxation rate hereinafter) is larger in glass containing more alkali metal ion A of small ion radius, and that it is larger at high temperatures. Generally, in the ion-exchange treatment, the relaxation of compressive stress occurs at a relatively low speed simultaneously with the occurrence of compressive stress. We have found for the first time that glass which has undergone this relaxation for longer periods of time has smaller rates of relaxation by subsequent treatments. On the basis of this new finding, we have discovered a method of treating glass articles having very large compressive stress on the surface of the glass article or a layer very near the surface within a relatively short time.

According to this invention, there is provided a method of treating a glass article by exchanging alkali metal ion A contained in the glass article with alkali metal ion B having a larger ion radius than that of the ion A thereby to increase the strength of the glass article, which comprises subjecting the glass article containing the alkali metal ion A to a first-stage ion-exchange step of contacting it with a salt comprising alkali metal ion A and alkali metal ion B in a predetermined proportion at a temperature below the strain point of said glass article for a predetermined period of time, and then subjecting the glass article so treated to a second-stage ion-exchange step of contacting it with a salt containing an alkali metal ion B at a higher proportion than the proportion of the alkali metal ion A and the alkali metal ion B of the salt used in the first-stage step at a temperature lower than that in the first-stage step and/or for a shorter period of time than that in the first-stage step under milder ion-exchange reaction conditions than those employed in the first-stage step.

Figure 2:
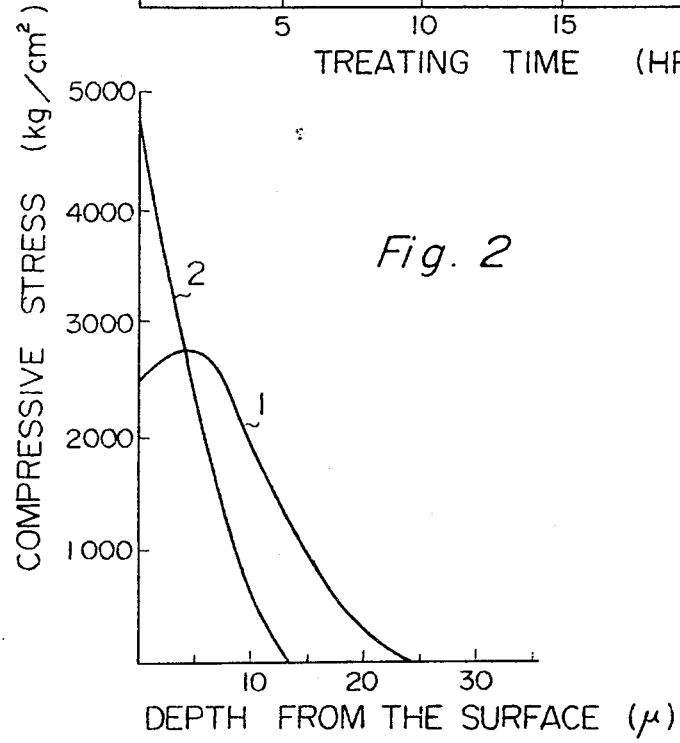

The method of this invention will be described in greater details below with reference to the accompanying drawings in which:

FIG. 1 is a graphic representation showing the relation among the symmetrical bending strength of glass treated by ion-exchange in accordance with the conventional one-step process, the treating time and the treating temperature; and FIGS. 2 and 3 show the distributions of surface compressive stress in the depth direction of a sheet glass and a face cover glass of a clock or watch both of which were treated in accordance with the process of this invention, in comparison of the conventional one-step treatment.

In the first-stage treatment of the method of this invention, a glass article having alkali metal ion A is contacted with a mixed salt bath containing the alkali metal ion B having a larger ion radius than that of the ion A at a temperature below the strain point of the glass, thereby to introduce the alkali metal ion B into the surface layer of the glass article and allow a part of the alkali metal ion A to remain in the desired proportion to form an exchange layer allowing the remaining alkali metal ion A to be exchanged with the alkali metal ion B in the second-stage treatment. Good results are obtained by adjusting the proportion of the alkali metal ion B in the mixed salt bath used in the first-stage treatment to 30 to 90 mol percent, preferably 60 to 80 mol percent, based on the sum of the alkali metal ions A and B in the bath.

By this first-stage treatment, the exchange of the alkali metal ions occurs in the glass article, and at the same time, the relaxation of the compressive stress, as described above, also takes place. It is this relaxing of the compressive stress occurring in the first-stage treatment that contributes to the formation of a layer which is difficult of relaxing of compressive stress in the second-stage treatment (a layer having a low rate of compressive stress relaxation).

Subsequently, the glass article treated in the first-stage treatment is contacted with a salt bath containing the alkali metal ion B in a proportion higher than that in the salt bath used in the first-stage treatment under milder treating conditions for the alkali metal ion exchange than those employed in the first-stage treatment, i.e., for shorter time periods and/or at lower temperatures than those employed in the first-stage treatment, whereby the alkali metal ion A remaining on the surface of the glass article is exchanged with the alkali metal ion B. Since the layer having a low rate of relaxation of compressive stress is formed in the first-stage treatment, the compressive stress caused by the ion-exchange treatment in the second-stage treatment is relaxed only to a slight degree, and there can be obtained a glass article having extremely high compressive stress on the surface.

The temperature of the first-stage treatment that may be selected is one at which the relaxing of compressive stress occurs at a lower speed than the speed of ion exchange in the surface layer of the glass article. The employment of the strain point of the glass or temperatures above the strain point should be avoided since the relaxing of compressive stress takes place rapidly, and the rearrangement of the glass network leads to the loss of the intended layer having a low rate of relaxation. On the other hand, too low temperatures should also be avoided since long periods of time are required for treatment because of an extremely small rate of ion-exchange. The preferred temperature for the first-stage treatment is below the strain point and up to 150°C. below the strain point, more preferably from 50°C. below the strain point up to 100°C. below the strain point.

The treating time in the first-stage treatment should be selected so as to give the maximum strength of the glass article at the treating temperature having regard to the relation between the strength and the treating time. Once this criterion is given, it is easy for those skilled in the art to determine suitable treating times according to the selected treating temperatures. Generally, depending upon the treating temperature, the treating time can vary from 5-10 minutes to several days, but from the economical point of view, about 10 minutes to about 24 hours are preferred.

Because of the need for inhibiting the stress relaxation as much as possible, the second-stage treatment should be performed under milder ion-exchange reaction conditions than those employed in the first-stage treatment, and at lower temperatures and/or shorter periods time than those employed in the first-stage treatment. However, in order to induce the necessary extent of ion-exchange within the desired period of time, the mildness of the ion-exchange reaction conditions in the second-stage treatment is limited. Generally, the mild conditions to be employed in the second-stage treatment should be such that the amount of ion-exchange in the second-stage treatment alone is about ¼ to ½ of that in the first-stage treatment alone. For examples, when the first-stage treatment is carried out at 460°C. for 16 hours, it is desirable that the second-stage treatment should be carried out for 1 to 4 hours at 460°C. Similar results are obtained when the second treatment is carried out at 490°C. for 15 minutes to one hour, or at 430°C. for 4 to 16 hours.

When the alkali metal ion A contained in the glass article is Li, Na, K, Rb or Cs can be used as the alkali metal ion B which has a larger ion radius than that of the alkali metal ion A. When the ion A is Na, K, Rb or Cs can be used as B. From an economical viewpoint, however, the use of Na as the ion A and K as the ion B is most preferred.

In a preferred embodiment of the process of this invention, the second-stage treatment is carried out in a plurality of stages wherein the proportion of the alkali metal ion B in one stage is equal to, or larger than, that in the preceding stage and also the ion-exchange reaction conditions in one stage are milder than those in the preceding stage. This makes it possible to render the ion-exchange layer relatively deeper and to obtain a glass article having a high residual compressive stress. Furthermore, in the second-stage treatment, the salt adhering to the glass article as a result of the first-stage treatment should desirably be completely removed by washing. But when the second-stage treatment is performed in a plurality of stages, the first of these stages may be used to wash out the salt adhering to the glass article, and the ion-exchange may be performed in the second and subsequent stages.

For simplicity of description, we have described the salt bath limited to alkali metal ions A and B, but so long as ion-exchange for increasing the strength of glass articles is carried out within the scope of this invention, the presence of some amounts of impurities, agents for maintaining the activity of the salt bath such as salts containing metal ions, e.g., Ag, Ti, Mn, binders and fillers, such as clay and diatomaceous earth is permissible.

The invention will be specifically illustrated by the following Examples, but it should be understood that the present invention is not limited to the specific substances, temperatures, treating times and other conditions described in the Examples.

EXAMPLE 1

A glass sheet 2 mm thick, 40 mm wide and 50 mm long ($SiO_2$ 72.5 percent, $Al_2O_3$ 1.7 percent, CaO 7.6 percent, MgO 3.9 percent, $Na_2O$ 13 percent, strain point 515°C.) was immersed for 16 hours in a mixed salt bath of $NaNO_3$ and $KNO_3$ in a molar ratio of 4:6 and held at 460°C. The molten salt adhering to the glass sheet was removed by washing with water, and the glass sheet was immersed for 4 hours in a $KNO_3$ bath maintained at 460°C. The treated glass was washed with water, and dried. The strength of the glass sheet was measured by the symmetrical bending strength. According to the symmetrical bending strength, the sample glass sheet was placed on a ring of a predetermined diameter, and a ring having an outside diameter smaller than the inside diameter of this ring was placed on the glass sheet. A load was exerted on the glass sheet, and the break strength of the glass sheet was calculated from the load at the time of breakage. In the present invention, the underside support ring had a diameter of 32 mm, and the upper ring had a diameter of 12 mm. The measurement was made using 20 specimens, and a mean value of the 20 specimens was taken. The results are shown in Table 1. A part of the specimen was taken, and made a thin piece. Optical strain was measured using this specimen in order to measure the distribution of the surface compressive stress in the depth direction. The results are shown in FIG. 2.

For comparison, the strength and compressive stress distribution of a glass sheet of the same composition which was treated by the conventional one step process under conditions which gave the maximum strength (immersed in a $KNO_3$ bath at 460°C. for 16 hours) are also shown in Table 1 and FIG. 2. In FIG. 2, curve 1 indicates the surface compressive stress distribution in the depth direction of glass treated by the conventional treating method, and curve 2, that of glass treated by this Example.

TABLE 1

| Treating conditions | Symmetrical bending strength($Kg/cm^2$) | | |
|---|---|---|---|
| | Average | Maximum | Minimum |
| Example 1 | 9,500 | 11,000 | 8,300 |
| $KNO_3$, 460°C., 16 hrs. | 6,870 | 8,170 | 5,630 |

It is seen from Table 1 that the strength of the glass sheet treated by this invention is by far greater than that of the glass treated by the conventional one-step process in average, maximum and minimum values. Furthermore, from the outstanding difference in the distribution of the surface compressive stress in the depth direction shown in FIG. 2, it can be said that the strength of the glass treated by the process of this invention becomes larger than that of the glass treated by the conventional method as a result of marked improvement in the compressive stress of the glass surface.

EXAMPLE 2

A face cover glass for a watch having a diameter of 31 mm and a thickness of 1.3 mm at the center ($SiO_2$ 67.8 percent, $AS_2O_3$ 0.5 percent, $Na_2O$ 17.4 percent, $K_2O$ 0.1 percent, BaO 3.0 percent, $B_2O_3$ 11.7 percent, strain point 490°C.) was immersed for 15 hours in a mixed salt bath consisting of $NaNO_3$ and $KNO_3$ in a molar ratio of 3:7 held at 430°C., and then without washing the surface of the glass, immersed for 2 hours in a $KNO_3$ bath at 430°C. for 2 hours, followed by immersion in another $KNO_3$ bath at 400°C. for 3 hours without washing the glass surface. The treated glass was then washed with water, and dried. Then, the ball falling test was performed. According to the ball falling test, a rubber sheet 0.4 mm thick was spread on a steel substrate, and the specimen was placed on it with its convex portion facing upwards. An oak ball having a diameter of 40 mm and a weight of 50 g was let fall. When the ball was let fall from a height of 310 cm, the breakage rate of the specimen treated by the conventional one-step process under conditions giving the maximum ball fall strength (immersed in a $KNO_3$ bath for 17 hours at 400°C.) was 88 percent, whereas the specimen treated by the Example of this invention had a breakage rate of only 45 percent.

The distributions of compressive stress in the depth direction of the specimens according to the conventional one-step treatment and the present Example are shown by curves 1 and 2 in FIG. 3, from which a drastic improvement in the surface compressive stress can be noted.

As previously stated, the ion-exchange tempering treatment of glass articles in accordance with the present invention is based on the positive utilization in the second-stage treatment of the stress relaxing phenomenon that occurs in the first-stage treatment. This procedure makes it possible to obtain glass articles having a large compressive stress on the surface or in a layer near the surface within relatively short periods of time without being limited to the selected glass composition as in the case of the conventional process. Accordingly, the process of this invention proves extremely useful in commercial operation.

What is claimed is:

1. A method of treating a glass article by exchanging an alkali metal ion consisting essentially of alkali metal ion A contained in the glass article with an alkali metal ion B having a larger ion radius than that of the ion A thereby to increase the strength of the glass article, which comprises subjecting the glass article containing the alkali metal ion A to a first-stage ion-exchange step of contacting it with a salt comprising alkali metal ion A and alkali metal ion B wherein the amount of alkali metal ion B is 30 to 90 mol percent based on the sum of alkali metal ions A and B at a temperature up to 150°C below the strain point of said glass article for a predetermined period of time, and then subjecting the glass article so treated to a second-stage ion-exchange step of contacting it with a salt containing an alkali metal ion B, alone or in admixture with alkali metal ion A, at a higher proportion than the proportion of the alkali metal ion A and the alkali metal ion B of the salt used in the first-stage step at a temperature lower than that in the first-stage step and/or for a shorter period of time than that in the first-stage step such that the amount of ion exchange by the second stage treatment alone is ¼ to ½ of that by the first stage treatment alone.

2. The method of claim 1, wherein the treatment temperature is from 50°C. below the strain point to 100°C. below the strain point.

3. The method of claim 1, wherein the content of the alkali metal ion B is 60 to 80 mol percent based on the sum of the alkali metal ions A and B.

4. The method of claim 1, wherein the second-stage treatment is carried out in a plurality of stages wherein the proportion of the alkali metal ion B in one stage is equal to, or larger than, that in the preceding stage and also the ion-exchange reaction conditions in one stage are milder than those in the preceding stage.

* * * * *